United States Patent Office 3,446,693
Patented May 27, 1969

3,446,693
BREATHABLE POLYVINYL CHLORIDE MATERIAL AND METHOD OF MAKING SAME
Robert L. Alig and George Rappaport, Dayton, Ohio, assignors to General Motors Corporation, Detroit, Mich., a corporation of Delaware
Filed Dec. 16, 1965, Ser. No. 514,249
Int. Cl. B32b 27/30, 3/26, 5/18
U.S. Cl. 161—160
20 Claims

ABSTRACT OF THE DISCLOSURE

A breathable vinyl resin sheet material formed by incorporating in a vinyl plastisol a blowing agent mixture including hydrated sodium borate and silica hydrogel and optionally, sodium bicarbonate, sheeting the plastisol mixture and heating the material to cause an evolution of gases from the blowing agents for creating interconnecting voids in the sheet material and to fuse the plastisol into a breathable sheet.

---

This invention relates to breathable polyvinyl chloride material and is particularly concerned with microporous polyvinyl chloride sheet materials that have a surface texture approximating that of chamois.

It is one of the objects of this invention to provide porous polyvinyl chloride sheet material and a method for making same wherein the pores through the material are of a microscopic nature and wherein the material may be reinforced with a fabric or gauze backing which is integrated thereto during the manufacture thereof.

In carrying out the above object it is a further object of the invention to provide a porous polyvinyl chloride sheet material having a void content in the order of 8 to 50% by volume.

A still further object of the invention is to provide a method for making microporous polyvinyl chloride material from a polyvinyl chloride plastisol wherein the porosity is created by a combination of void forming materials that react sequentially and in overlapping relation to one another during a fusion period to provide a blow of generally increasing quantities of gas that forms cells during initial fusing and which increases in pressure to rupture the cell walls at a time the fusing step is substantially complete.

In carrying out the above object it is a further object to use a combination of void forming materials consisting of hydrated sodium borate and silica hydrogel to which may be added, if desired, a small quantity of sodium bicarboante.

Further objects and advantages of the present invention will be apparent from the folowing description, reference being had to the accompanying drawings wherein preferred embodiments of the present invention are clearly shown.

Figure 1:
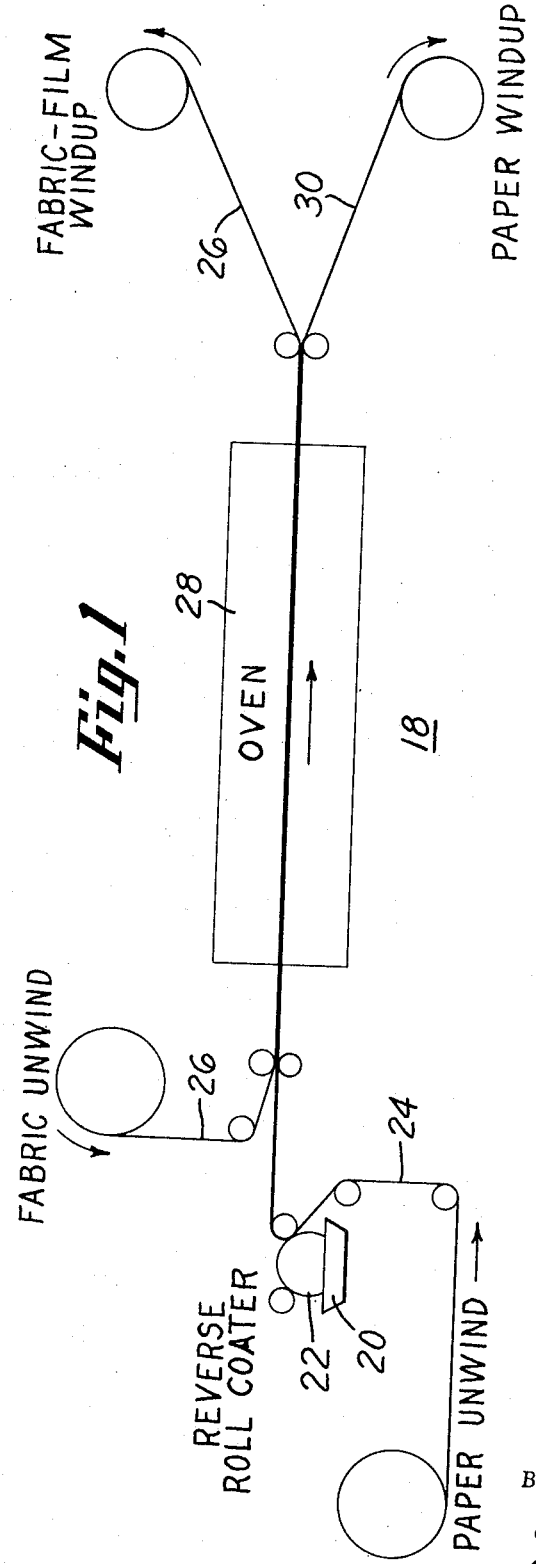
FIG. 1 is a diagrammatic view of an apparatus used to produce a gauze backed polyvinyl chloride sheet material.

In the manufacture of clothing, upholstery, footwear and various other articles, the use of synthetic resins as substitutes for leather has been rather wide spread. In each instance, however, the substitution of the synthetic material for the natural leather has created problems with respect to breathability and "feel" of the material. The synthetic resin materials are nonporous in nature which makes them exceedingly hot when used as wearing apparel or upholstery since air cannot circulate there-through. Further, the synthetic materials are smooth surfaced and do not approximate the texture of leather.

We have found that these objections to synthetic resinous materials as substitutes for natural leather can be overcome to a large degree by properly compounding the polymer used in the manufacture of the material whereby a degree of microporosity is produced which permits breathability of the sheet material and simultaneously improves the "feel" thereof so that the "feel" of the surface of the material approximates that of a chamois. Synthetic sheet material of this nature can, of course, be textured to include a leather-like grain or other surface texture and may also be painted with a vinyl lacquer which integrates itself to the material per se for providing the desired color to the side that is visible after the material has been formed.

We are aware that many attempts have been made in the past to produce breathable materials and we are also aware that in each case the breathability of the material has not been satisfactory due to various factors which for the most part are directed to the production of interconnecting pores within the material so that air may pass completely therethrough. Numerous blowing or pore forming agents have been proposed in the past but in each instance, to our knowledge, the pores that are formed are closed or partially closed by collapse of the material during the final fusion of the plastisol due to reduced pressure and/or absence of an extended period of gas evolution during the substantially complete fusing cycle, and this is particularly true in the case of articles made from polyvinyl chloride plastisols. The present invention, is therefore, directed specifically to polyvinyl chloride sheet material wherein a high degree of microporosity exists so that the material is freely breathable.

Specifically, we propose to use a homopolymer of polyvinyl chloride in the form of powder. A powder having an average particle size of about 1.7 microns was used in the recipes recited herein although this particle size may vary widely as desired. There are numerous homopolymers of this type on the market, one of which is sold under the trade name Marvinol VR-50. Another is termed Exon 654, still another is Opalon 440, etc. Any of these or their equivalents may be used as the entire polyvinyl chloride ingredient or this ingredient may be supplemented with equal quantities of other homopolymers of polyvinyl chloride of the same or different particle size which will improve the air release properties of the blended compound during fusion thereof. One such homopolymer used in blending is Marvinol VR-51. In any instance, the polyvinyl chloride powder is mixed with a suitable plasticizer such as dioctyl phthalate, Flexol 380 (di-2-ethylhexyl isophthalate), etc. to form a pasty mass and then the void forming materials (in initially mixed form, preferably ground together) are added thereto together in some cases with a stabilized. When a complete mixture of the ingredients is obtained the plastisol is preferably doctored out onto a mold surface such as a kraft paper sheet or metal plate, etc., and if high strength is desired, cheesecloth, gauze or other fabric backing is pressed onto the free side thereof to form a "sandwich" structure. The present material is highly useful in doctor blade operations since the high viscosity materials are more easily spread than when the mixture is readily flowable. The plastisol is then fused in an oven at suitable temperatures and for a sufficient time to cause the polyvinyl chloride material to fuse into a strong, tough sheet. During this fusion period, the several void forming materials create gases over extended ranges of the temperatures and times to produce microscopic interconecting voids in the sheet. Thereafter, the fused microporous sheet with the gauze backing integrated therewith is removed from the paper or other mold surface and is spray painted, if required, to the desired color.

FIG. 1 shows diagrammatically an apparatus 18 for producing the material in continuous strip form. In this apparatus the plastisol is fed in a uniform layer from a container 20 by roller 22 onto a strip of kraft paper 24. This coated strip then has a strip of fabric 26 superimposed on its top side and the assembly passes into an oven 28. As the composite sandwich-like strip moves through the oven the plastisol is fused and the void forming materials are activated to form the microporous structure and the fabric 26 is integrated to the microporous polyvinyl chloride layer to form a composite fused strip 30 which, when it emerges from the oven, has the paper 24 stripped therefrom and is ready for painting if a surface color is desired.

The material produced will have a chamois-like "feel" and will have a substantial degree of microporosity wherein the void content will vary from between 8 to 50% by volume in accordance with the quantity of void forming materials originally added thereto. In this connection, it is apparent that this range of void content is not necessarily limiting but is within the more practical range. Obviously, if the content of voids is less than 8% there is little use of producing the voids whereas if the void content exceeds 50% the strength of the material is reduced sufficiently making it unsatisfactory for many of its intended uses. However, in this connection, if no great strength is required, greater porosity may be obtained by increasing the quantity of void forming materials.

One formula which produces a highly satisfactory material is as follows:

*Formula #1*

| Ingredient: | Parts by weight |
| --- | --- |
| Marvinol VR-50 | 21.35 |
| Marvinol VR-51 | 21.35 |
| Dioctylphthalate | 42.70 |
| Sodium borate·10 $H_2O$ | 6.65 |
| Sodium bicarbonate | 2.70 |
| Silica hydrogel | 4.00 |
| Barium-cadmium complex soap stabilizer | 1.25 |

The sodium bicarbonate is optional and can be eliminated if fusion temperatures are at the low end of the fusion range to be discussed herein. The stabilizer may be any suitable stabilizer that will improve heat stability of the compound and, again, is an optional material, the use of which is dictated by the fusion temperatures whereby lower temperatures do not necessarily require the use of the stabilizer.

In practice, with respect to the above formula, the dioctyl phthalate together with the polyvinyl chloride powder is blended in a Hobart mixer. The remaining ingredients, namely the sodium borate, sodium bicarbonate, if used, silica hydrogel and stabilizer are ground together in a pulverizer and are then blended together with the polyvinyl chloride and plasticizer mixture to form a smooth, viscous fluid. The pulverization should be sufficient to produce very small particles of the blowing materials, preferably −100 micron size. Larger particles destroy the micorporous nature of the sheet. This may be used in a batch process or in a continuous process, as noted in FIG. 1. In either case, however, the viscous fluid is spread on a molding surface, which may or may not be textured, in a layer of, for example, between .020″ and .110″ thick and preferably between .035″ and .073″. This plastisol mixture is then baked or fused for a period of from 8 to 10 minutes at a temperature of from about 330° to 360° F. with 350° F. preferred. When the temperature is at the lower end of this range the use of the stabilizer and the improved air release polyvinyl chloride powder may be eliminated. At the high end of the range it is preferable to use the formulation as set forth. During the heating period the polyvinyl chloride particles are fused together into a strong sheet which is integrated with the gauze and which takes on the impression of the mold surface upon which it was supported during fusion.

Figure 2:
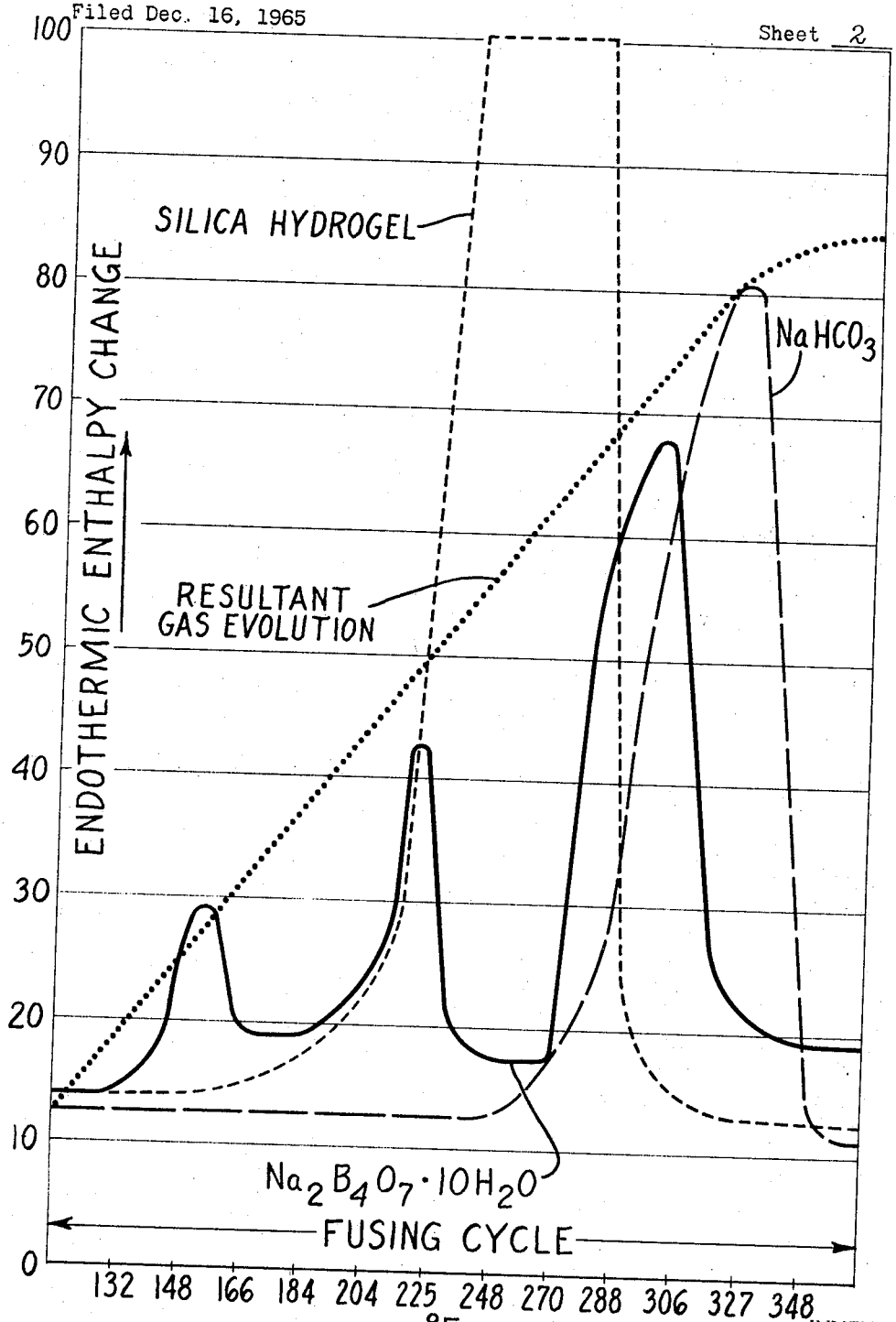
FIG. 2 is a series of charts showing the temperatures at which the blowing activity takes place for the three blowing agents, namely, sodium borate, silica gel and sodium bicarbonate.

During the baking period the various void forming materials create gases in overlapping periods and in increasing quantities which form voids that are interconnecting. This is an important part of the process if a satisfactory material is to be formed since the sodium borate, as will be seen from the chart in FIG. 2, has three blowing periods which are sequentially of greater activity whereby voids are formed and are enlarged progressively as the degree of fusion increases in the polyvinyl chloride compound. These voids are eventually ruptured to cause interconnection through the introduction of large qantities of steam released by the silica hydrogel toward the end of the fusion period. At this time, however, the fusion of the polyvinyl chloride has progressed sufficiently to prevent subsequent collapse whereby interconnection between the voids is maintained and eruption craters on the surface of the compound are eliminated so that a smooth appearing surface is obtained. If the sodium bicarbonate is used it also blows toward the upper end of the fusion range and is effective when the higher temperatures of fusion are used to improve the continuity of the void structure. A resultant curve is superimposed showing the ever increasing volumes of gases being produced during the fusing period.

The sheet, after fusion, is removed from the mold surface and has a porosity in the order of 20% and if it is desired to be colored it may be spray painted with a polyvinyl chloride lacquer which will more or less integrate with the sheet to form a thin colored layer therewith. If properly applied the surface voids will not be closed by the lacquer whereby the porosity of the part is maintained. It is apparent that the entire compound may be colored by use by a dye added to the initial recipe, although surface coloring is for most purposes, less costly and more useful in production operations since it eliminates the necessity of color matching when scrap material has been added to the initial batch as is often the case.

The use of silica hydrogel, which is produced under the teachings of Patent 1,755,496, is an important part of this invention. This silica hydrogel is a very light fluffy material of substantial volume which when mixed into the polyvinyl chloride homopolymer forms a multiplicity of pore sites. When the proper blowing temperatures are reached during the fusion procedure, the silica hydrogel releases water vapor in the form of steam which is equivalent to approximately 70% of its own weight whereby a vast amount of void forming gases are produced.

The porosity of the sheet formed in accordance with the preferred recipe have been measured by following the standard A.S.T.M. Spec. D726-58, method C, with the following results. A sheet having a thickness of .030″ to .035″ will pass air in the order of 2290 cc. to 2390 cc. per sq. in. per minute. When this sheet is painted, the porosity is reduced to some extent but there is still substantial passage of air therethrough. It may be mentioned here that if the sheet is washed by passing it through wringer rolls, or otherwise, under water that the soluble borate salts and carbonate salts, if present, are largely dissolved which increases the porosity of the sheet to some extent. However, we have found that it is generally unnecessary to wash the sheet since the materials that remain therein have no deleterious effect and are in relatively small quantities whereby the expense of washing is hardly justified. With respect to the polyvinyl chloride homopolymers used in the initial mixture we prefer to use blends of various types of polyvinyl chloride polymers to produce ease of processing the material. As is well known in the art, various polymers fuse differently with respect to time and temperature whereby a blend of different polymers, as suggested, reduces processing problems. However, it should be understood that any single homopolymer of polyvinyl chloride may be used by persons skilled in the art and satisfactory materials will be produced with proper well known controls.

Additional formulations which form satisfactory sheet material using various types of plasticizers and various proportions of materials, etc. are as follows:

*Formula #2*

| Ingredient: | Parts by weight |
|---|---|
| Opalon 440 | 21.6 |
| Exon 654 | 21.6 |
| Flexol 380 | 21.6 |
| Dioctylphthalate | 21.6 |
| Sodium bicarbonate | 2.7 |
| Sodium borate·10 $H_2O$ | 6.8 |
| Silica hydrogel | 4.1 |

The material was processed as before using a maximum fusing temperature of 348° F. and produced a microporous sheet .110″ thick of good quality.

*Formula #3*

| Ingredient: | Parts by weight |
|---|---|
| Marvinol VR-51 | 22.2 |
| Opalon 440 | 22.2 |
| Dioctylphthalate | 44.4 |
| Sodium borate .10 $H_2O$ | 7.0 |
| Silica hydrogel | 4.2 |

A satisfactory microporous sheet .75″ thick was produced by the aforementioned processing procedures using a maximum fusing temperature of 340° F.

*Formula #4*

| Ingredient: | Parts by weight |
|---|---|
| Exon 654 | 40.8 |
| Flexol 380 | 40.7 |
| Silica hydrogel | 3.8 |
| Sodium borate .10 $H_2O$ | 3.8 |
| Sodium bicarbonate | 10.9 |

The above materials processed as before at a maximum fusing temperature of 360° F. produced a satisfactory microporous sheet .850″ thick.

*Formula #5*

| Ingredient: | Parts by weight |
|---|---|
| Marvinol VR-50 | 19.7 |
| Marvinol VR-51 | 19.7 |
| Dioctylphthalate | 49.4 |
| Sodium bicarbonate | 2.8 |
| Sodium borate .10 $H_2O$ | 4.2 |
| Silica hydrogel | 4.2 |

The above materials processed as before at 350° F. produced a satisfactory microporous sheet .50″ thick.

*Formula #6*

| Ingredient: | Parts by weight |
|---|---|
| Marvinol VR-50 | 20.8 |
| Marvinol VR-51 | 20.8 |
| Flexol 380 | 41.6 |
| Sodium bicarbonate | 2.6 |
| Sodium borate .10 $H_2O$ | 6.5 |
| Silica hydrogel | 7.7 |

The above materials processed as before at 355° F. produced a satisfactory microporous sheet .200″ thick.

It is apparent that numerous other formulations may be used which fall within the scope of this invention. So long as polyvinyl chloride plastisol makes up the main ingredient of the sheet material this plastisol before fusing has incorporated therein hydrated sodium borate and silica hydrogel with or without sodium bicarbonate.

While the embodiments of the present invention as herein disclosed, constitutes preferred forms, it is to be understood that other forms might be adopted.

What is claimed is as follows:

1. In a method for making a breathable polyvinyl chloride sheet, the steps of mixing at least two void forming materials consisting of hydrated sodium borate and silica hydrogel with a polyvinyl chloride plastisol, sheeting said mixture, heating the sheeted material for causing the evolution of gases from said void forming material for creating interconnecting voids in said sheet material and for fusing said plastisol into a strong, integrated sheet that is breathable, and finally cooling the sheet so made.

2. The method claimed in claim 1 wherein the sheet is textured at one surface thereof during heating.

3. The method claimed in claim 1 wherein the sheet is painted after heating.

4. The method claimed in claim 2 wherein the textured sheet is painted after heating.

5. The method claimed in claim 1 wherein sodium bicarbonate is added to the void forming materials.

6. The method claimed in claim 4 wherein a fabric backing is integrated to the polyvinyl chloride layer on the side of the sheet opposite to the painted side during the heating and fusing steps.

7. In a method for making a breathable polyvinyl sheet having microporosity within the range of 8% to 50% by volume, the steps comprising; mixing sodium borate having 10 molecules of water of hydration per molecule of sodium borate with silica hydrogel, adding said mixture to a polyvinyl chloride plastisol in quantities sufficient to yield the ultimate microporosity desired, and blending until a smooth spreadable fluid is obtained, spreading said fluid upon a supporting surface in a layer of substantially uniform thickness, heating said layer to a temperature sufficient to fuse the polyvinyl chloride and to concomitantly cause an evolution of gases from said mixture over a substantial portion of said heating period for forming microporous interconnecting pores throughout said polyvinyl sheet and then removing said microporous sheet from said surface.

8. The method of claim 1 wherein the procedure is carried out continuously.

9. A new article of manufacture consisting of a microporous polyvinyl chloride sheet made by the method set forth in claim 1.

10. A new article of manufacture consisting of a microporous polyvinyl chloride sheet made by the method set forth in claim 7.

11. In a method for making a breathable polyvinyl chloride sheet, the steps comprising, a void forming material consisting of an intimate mixture of 4 to 8 parts by weight of sodium borate including 10 molecules of water of hydration, 3 to 10 parts by weight of silica hydrogel and 0 to 4 parts of sodium bicarbonate, adding said mixture to 70 to 90 parts by weight of a polyvinyl chloride plastisol and working the same into a smooth spreadable fluid, spreading said fluid in a substantially uniform layer at least .020″ thick upon a supporting surface, heating said supported layer at a temperature and for a time sufficient to fuse the polyvinyl chloride into a self sustaining sheet while simultaneously progressively causing the evolution of gases from said sodium borate, silica hydrogel and sodium bicarbonate throughout a substantial portion of said heating period to create, form and maintain a multiplicity of interconnecting microporous voids throughout said sheet and then removing said breathable sheet from said supporting surface.

12. A new article of manufacture consisting of a microporous polyvinyl chloride sheet made in accordance with the method set forth in claim 11.

13. A new article of manufacture consisting of a breathable polyvinyl chloride sheet made in accordance with claim 7.

14. In a method for making a breathable polyvinyl chloride sheet, the steps comprising, a void forming material consisting of an intimate mixture of 6 to 8 parts by weight of sodium borate including 10 molecules of water of hydration with 2 to 6 parts by weight of silica hydrogel and 0 to 4 parts of sodium bicarbonate, adding said void forming material to from 70 to 90 parts by weight of a polyvinyl chloride plastisol and working the same into a smooth spreadable fluid, spreading said fluid in a substantially uniform layer of from .020″ to .110″ thick upon a supporting surface, heating said supported layer at a temperature of from 330° F. to 360° F. for a time sufficient to fuse the polyvinyl chloride into a self sustaining sheet while causing a simultaneous and progressive evolution of gases from said void forming mixture through a substantial portion of the heating period to create, form and maintain a multiplicity of interconnecting microporous voids throughout the said sheet, and then removing the breathable sheet so formed from the supporting surface.

15. The method claimed in claim 14 wherein the supporting surface is textured.

16. The method claimed in claim 14 wherein the breathable sheet is painted on its supported side.

17. The method claimed in claim 14 wherein a layer of fabric is superimposed on the unsupported surface of the spreadable fluid layer and is integrated to the sheet during the heating and fusing steps.

18. The method claimed in claim 14 wherein the steps are carried out continuously.

19. A new article of manufacture consisting of a microporous polyvinyl chloride sheet made in accordance with the method set forth in claim 14.

20. A new article of manufacture consisting of a microporous polyvinyl chloride sheet made in accordance with the method set forth in claim 17.

References Cited

UNITED STATES PATENTS

| | | | |
|---|---|---|---|
| 2,586,887 | 2/1952 | Gaver | 156—79 X |
| 2,888,414 | 5/1959 | Fuller | 156—79 |
| 2,895,926 | 7/1959 | Rappaport. | |
| 2,911,379 | 11/1959 | Parker. | |
| 2,920,977 | 1/1960 | Adams | 161—160 X |
| 2,930,771 | 3/1960 | Wade. | |
| 3,078,240 | 2/1963 | Hoshino. | |
| 3,114,724 | 12/1963 | Hunter | 260—2.5 |
| 3,190,844 | 6/1965 | Milone. | |

EARL M. BERGERT, *Primary Examiner.*

C. B. COSBY, *Assistant Examiner.*

U.S. Cl. X.R.

156—79, 333; 161—249, 256; 260—2.5; 264—49, 53, 54